US012562833B2

(12) United States Patent

Cahill

(10) Patent No.: US 12,562,833 B2

(45) Date of Patent: Feb. 24, 2026

(54) WAVELENGTH-TUNED SLED USED AS OPTICAL SOURCE FOR ULTRA-WIDEBAND WAVELENGTH REFERENCE

(71) Applicant: II-VI Delaware, Inc., Wilmington, DE (US)

(72) Inventor: Michael John Laurence Cahill, Melbourne (AU)

(73) Assignee: II-VI DELAWARE, INC., Wilmington, DE (US)

( * ) Notice: Subject to any disclaimer, the term of this patent is extended or adjusted under 35 U.S.C. 154(b) by 0 days.

(21) Appl. No.: 18/760,179

(22) Filed: Jul. 1, 2024

(65) Prior Publication Data

US 2024/0356667 A1     Oct. 24, 2024

Related U.S. Application Data

(63) Continuation of application No. 17/826,523, filed on May 27, 2022, now Pat. No. 12,052,090.

(51) Int. Cl.
    *H04J 14/02*       (2006.01)
    *H04B 10/079*     (2013.01)

(52) U.S. Cl.
    CPC .... *H04J 14/0221* (2013.01); *H04B 10/07955* (2013.01)

(58) Field of Classification Search
    CPC ............. H04B 10/07955; H04B 10/572; H04J 14/0221; H01S 5/141; H01S 5/0612; G01N 21/39; G02F 1/213
    See application file for complete search history.

(56) References Cited

U.S. PATENT DOCUMENTS

| | | | |
|---|---|---|---|
| 6,985,281 B2 * | 1/2006 | Wagner .................. | G02F 1/218 |
| | | | 359/578 |
| 7,009,716 B2 * | 3/2006 | Kim ...................... | H01S 5/0683 |
| | | | 356/519 |
| 2001/0036210 A1 * | 11/2001 | Salomaa .............. | H04B 10/564 |
| | | | 372/32 |
| 2006/0065834 A1 * | 3/2006 | Flanders .................. | G01J 1/32 |
| | | | 250/339.07 |
| 2008/0080575 A1 * | 4/2008 | Murry ................. | H01S 5/02453 |
| | | | 372/34 |
| 2011/0211603 A1 * | 9/2011 | Zhang ....................... | H01S 5/12 |
| | | | 372/34 |
| 2017/0005729 A1 * | 1/2017 | Cahill ................ | H04Q 11/0066 |
| 2017/0288770 A1 * | 10/2017 | Mentovich ......... | H04B 10/0795 |

* cited by examiner

*Primary Examiner* — Pranesh K Barua
(74) *Attorney, Agent, or Firm* — Blank Rome LLP

(57) ABSTRACT

A wavelength reference device can be used to self-calibrate an optical channel monitor. The device includes a broadband source, a thermal source, and an optical filter, which can include one or more filters. A housing can house each of these components or can house at least the broadband source and thermal source. The broadband source emits an optical signal along an optical path. The thermal source in thermal communication with the broadband source can adjust the operating temperature of the broadband source within a temperature range. The temperature range is configured to shift optical power of the broadband source with respect to a multi-band wavelength division multiplexing (WDM) range such that the optical power meets a minimum power level towards lower and higher frequencies of the range. The optical filter(s) positioned in the optical path can filter the optical signal to create a spectral shape for use in wavelength referencing.

21 Claims, 5 Drawing Sheets

*50*

C+L band Ports *56*

MUX *72*

OCM-C+L *75*

WLREF-C+L *80*

Controller *76*

*82*

*50*

A+B band ports *56*

MUX *72*

OCM A+B *75*

WLREF A+B
FILT     SRC *83*

Controller *76*

A+B band ports *56*

MUX *72*

OCM A+B *75*

Controller *76*

WLREF A+B
SRC 1 *82a*
*83*
FILT     MUX     SRC 2 *82b*

Wavelength Reference

*120*

Optical Source

*110*

*122*

*130*

Optical Reference Filter

*82*

Wavelength-Sensitive Equipment

WAVELENGTH-TUNED SLED USED AS OPTICAL SOURCE FOR ULTRA-WIDEBAND WAVELENGTH REFERENCE

CROSS-REFERENCE TO RELATED APPLICATIONS

This application is a continuation of U.S. patent application Ser. No. 17/826,523, filed May 27, 2022. The aforementioned application is hereby incorporated by reference in its entirety.

BACKGROUND OF THE DISCLOSURE

In a Wavelength Division Multiplexing (WDM) system, a high-performance optical channel monitor (OCM) is used to provide accurate optical frequency and power reporting of the channels used in the WDM transmission. Most OCMs use a wavelength reference (WLREF) to self-calibrate the OCM's frequency to ensure accurate reporting of channel frequencies.

Some wavelength reference devices use a super luminescent light-emitting diode (SLED) due to its broad spectral profile and high power as their optical source. However, SLEDs are sensitive to temperature. In particular, as the SLED junction temperature increases, the center wavelength of the SLED's output also increases, and the output power decreases. When a single-band wavelength reference device is used in a typical OCM implementation, the SLED's temperature is simply allowed to change with the environment because there is typically sufficient spectral power for use in a WLREF. All the same, this can limit the wavelength range for which the wavelength reference device can be used as a source for the wavelength reference to the OCM.

In addition to the light source, the wavelength reference device also includes optical filter(s) that create a spectral response in the spectrum of the optical source. The spectral response has known spectral characteristics and is used as the wavelength reference. The filter(s) may be temperature-insensitive or may have a known temperature dependence.

Interest in transmission across multiple bands in WDM systems is increasing. Recent deployments offer two bands, such as C+L systems. Future plans may focus on additional bands, such as S+C+L systems.

The standard solution to provide wavelength referencing in a multi-band WDM system uses a single-band wavelength reference device for each of the WDM bands. For example, FIG. 1 illustrates a multi-band optical channel monitor (OCM) 10 having single-band wavelength reference devices 36 according to the prior art. The multi-band OCM 10 includes a splitter 20, a C-band submodule 30-C, and an L-band submodule 30-L. The splitter 20 splits C+L band WDM signals 12 input to the OCM 10 into C-band signals and L-band signals. The C-band submodule 30-C has a multiplexer 32, a C-band dedicated OCM 34, and a C-band dedicated wavelength reference device 36. Similarly, the L-band submodule 30-L has a multiplexer 32, an L-band dedicated OCM 34, and an L-band dedicated wavelength reference device 36.

The multiplexers 32 can be a coupler, a filter, or an optical switch. Other C and L-band ports 14-C, 14-L may be provided on the respective multiplexers 32, which outputs a channel 38 to be monitored to the dedicated OCM 34.

For wavelength reference, each of the dedicated wavelength reference devices 36 provides an input to the respective multiplexer 32, which can output the wavelength reference in the channel to the dedicated OCM 34. As can be seen, each of the single-band wavelength reference devices 36 is paired with a dedicated OCM 34 that monitors the respective WDM band. As is expected, the use of multiple wavelength reference devices 36 to support multiple WDM bands increases the costs and footprint of the multi-band OCM 10.

The subject matter of the present disclosure is directed to overcoming, or at least reducing the effects of, one or more of the problems set forth above.

SUMMARY OF THE DISCLOSURE

A wavelength reference device disclosed herein comprises at least one broadband optical source, at least one thermal source, and an optical filter. The at least one broadband optical source is configured to emit an optical power spectrum along an optical path. The at least one broadband optical source is temperature sensitive, and the optical power spectrum has a broadband wavelength range.

The at least one thermal source is disposed in thermal communication with the at least one broadband optical source and is configured to adjust an operating temperature of the at least one broadband optical source within a temperature range. The temperature range is configured to shift the optical power spectrum of the at least one broadband optical source with respect to a multi-band wavelength division multiplexing (WDM) range such that the optical power spectrum meets a minimum power level toward both the lowest and highest optical frequencies of the multi-band WDM range. The optical filter is positioned in the optical path and is configured to filter the optical power spectrum into a wavelength reference signal, which includes at least one reference spectral feature for at least one known optical frequency.

An apparatus, such as an optical channel monitor, disclosed herein is directed to processing signal input. The apparatus comprises an apparatus input, a signal detection and processing module, a wavelength reference device, and at least one controller. The apparatus input is configured to receive the signal input, and the signal detection and processing module is configured to detect and process the signal input. The wavelength reference device is disposed in optical communication with the apparatus input and is configured to produce a wavelength reference. The wavelength reference device, which can be similar to that discussed previously, has at least one broadband optical source, at least one thermal source, and an optical filter. The at least one controller is in signal communication with at least the signal detection and processing module and the wavelength reference device. The at least one controller is configured to control the wavelength reference device and is configured to calibrate the signal detection and processing module based on the produced wavelength reference.

As disclosed herein, a method comprises: emitting an optical power spectrum along an optical path using at least one broadband optical source, the at least one broadband optical source being temperature sensitive, the optical power having a broadband wavelength range; shifting the optical power spectrum of the at least one broadband optical source with respect to a multi-band wavelength division multiplexing (WDM) range such that the optical power spectrum meets a minimum power level towards lowest and highest frequencies of the multi-band WDM range by adjusting an operating temperature of the at least one broadband optical source within a temperature range using at least one thermal source disposed in thermal communication with the at least one broadband optical source; and filtering the optical power spectrum into a wavelength reference signal including at least one reference spectral feature for at least one known optical frequency.

The foregoing summary is not intended to summarize each potential embodiment or every aspect of the present disclosure.

BRIEF DESCRIPTION OF THE DRAWINGS

FIG. 3B illustrates a multi-band optical channel monitor having a single wavelength reference device with a single broadband source.

FIG. 3C illustrates a multi-band optical channel monitor having a single wavelength reference device with multiple broadband sources.

DETAILED DESCRIPTION OF THE DISCLOSURE

Figures 1, 2:
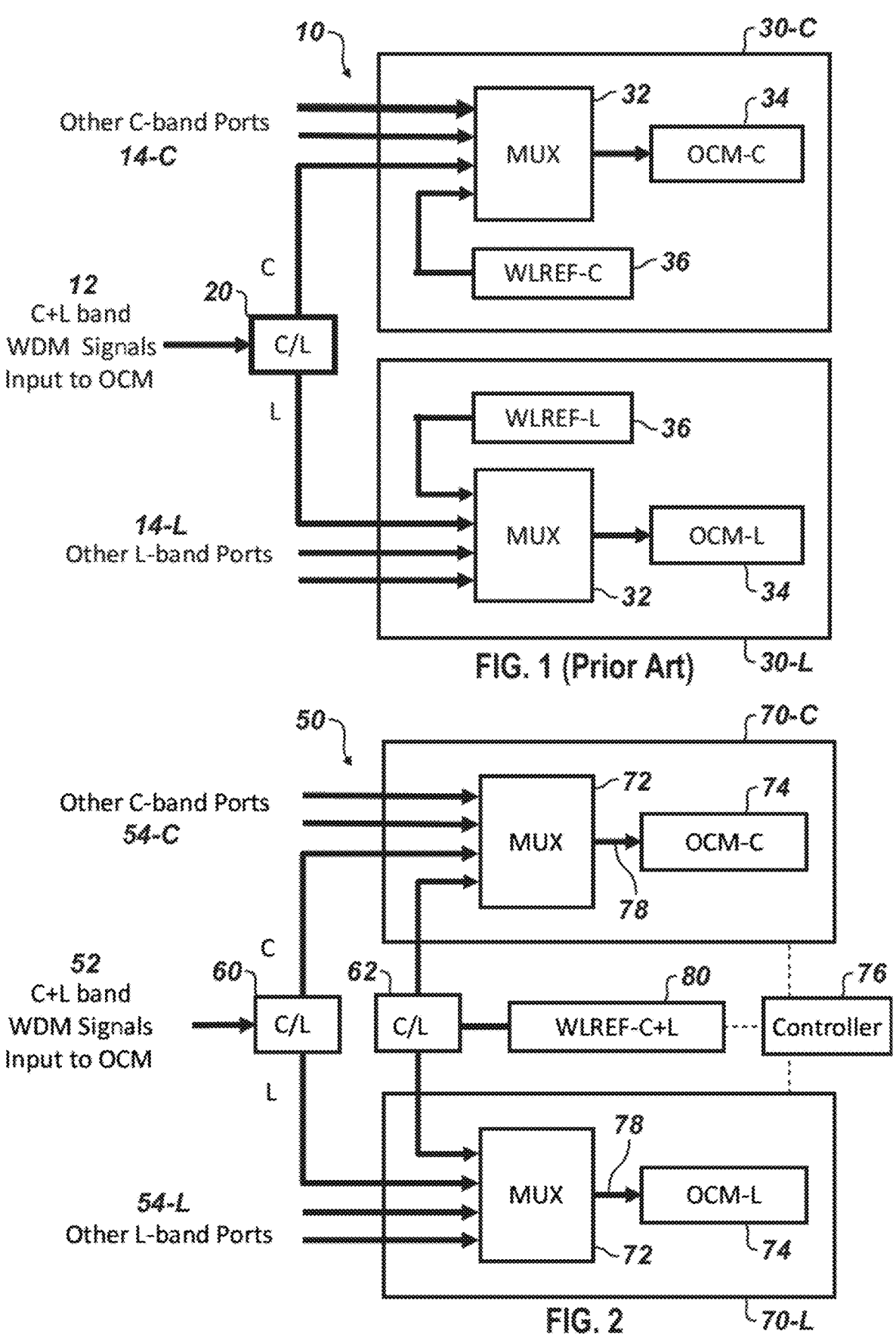
FIG. 1 illustrates a multi-band optical channel monitor having wavelength references according to the prior art.
FIG. 2 illustrates a multi-band optical channel monitor having wavelength references provided by a single wavelength reference device according to one embodiment of the present disclosure.

FIG. 2 illustrates a multi-band optical channel monitor (OCM) module 50 having a wavelength reference provided by a single, shared wavelength reference device 80 according to one embodiment of the present disclosure. The multi-band OCM module 50 includes a splitter 60, a C-band submodule 70-C, and an L-band submodule 70-L. As can be seen, the two submodules 70-C, 70-L of the OCM module 50 are for separate bands. The splitter 60 splits C+L band WDM signals 52 input to the OCM module 50 into C-band signals and L-band signals. The C-band submodule 70-C has a multiplexer 72 and a C-band dedicated OCM 74. Meanwhile, the L-band submodule 70-L has a multiplexer 72 and an L-band dedicated OCM 74.

The multiplexers 72 are part of the apparatus input for the OCM module 50, and the multiplexers 72 can be a coupler, a filter, or an optical switch. Other C and L-band ports 54-C, 54-L may be provided on the multiplexers 72, which output a channel 78 to be monitored to the dedicated OCM 74. The dedicated OCMs 74 can be signal detection and processing modules configured to detect and process the signal input for optical channel monitoring.

Figures 3A, 4:
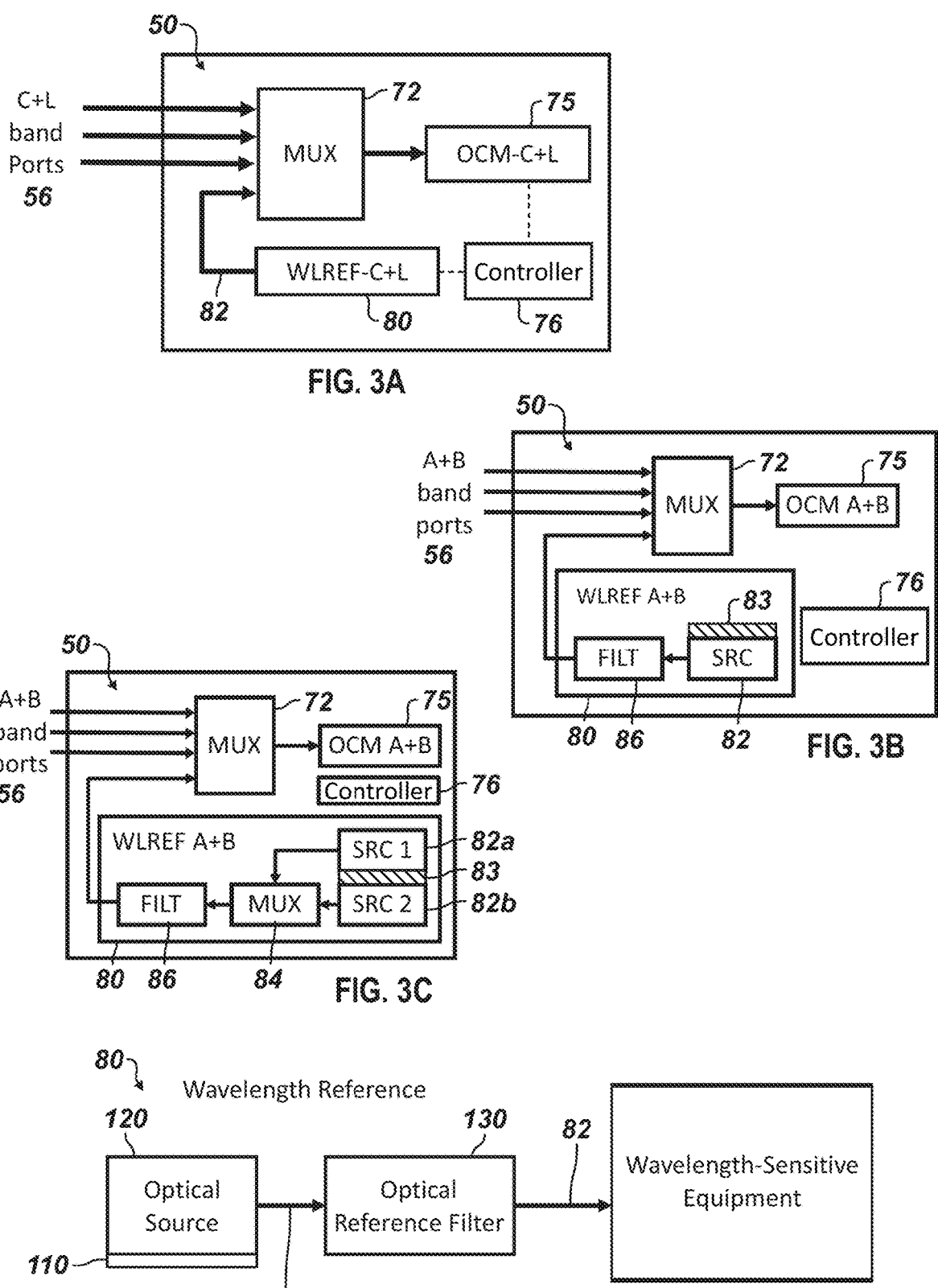
FIG. 3A illustrates a multi-band optical channel monitor having wavelength references provided by a single wavelength reference device according to another embodiment of the present disclosure.
FIG. 4 schematically illustrates a wavelength reference device according to the present disclosure.

For wavelength reference, the shared wavelength reference device 80 provides both C-band and L-band input to another splitter 62, which splits the respective bands to the corresponding multiplexer 72 of the submodules 70-C, 70-L. The multiplexers 72 can then output the wavelength reference in the channel 78 to the dedicated OCM 74. A controller 76 coordinates operation between the wavelength reference device 80 and the dedicated submodules 70-C, 70-L. As will be appreciated, the above arrangement can be expanded to include more input bands, such as an S-band, by using S+C+L splitters, adding an S-band submodule, and increasing the single wavelength reference device 80 to cover S+C+L bands In another arrangement, FIG. 3A illustrates a multi-band optical channel monitor (OCM) module 50 having wavelength reference provided by a single wavelength reference device 80. The OCM module 50 includes a multiplexer 72 and a C+L-band OCM 75. As part of the apparatus input for the OCM module 50, the multiplexer 72 has C+L band ports 56. The single wavelength reference device 80 provides both C-band and L-band input to the multiplexer 72. The C+L-band OCM 75 can be a signal detection and processing module configured to detect and process the signal input for optical channel monitoring. A controller 76 coordinates operation between the wavelength reference device 80 and the other components. As will be appreciated, this arrangement can also be expanded to include more input bands, such as an S-band.

In both of the above arrangements, the single wavelength reference device 80 provides an ultra-wideband power density spectrum for wavelength referencing in both C-band and L-band. To achieve this, each wavelength reference device 80 includes a broadband source, such as a super luminescent light-emitting diode (SLED), and each device 80 includes optical filter(s).

As noted above, the SLED used for wavelength referencing in the device 80 can be sensitive to temperature. In particular, as the SLED junction temperature increases, the center wavelength of the SLED's output also increases, and the output power decreases. To provide the ultra-wideband power density spectrum for multi-band (e.g., C-band and L-band) referencing, the controller 76 of the OCM module 50 adjusts the SLED's temperature to extend the range over which the wavelength reference device 80 can be used as a source for the multi-band wavelength referencing.

For example, FIG. 3B illustrates an example of a multi-band OCM module 50 having a wavelength reference device 80 to provide wavelength references. As shown, the wavelength reference device 80 includes a single broadband source 82 and an optical filter 86. Again, the broadband source 82 can be a super luminescent light-emitting diode (SLED). The wavelength reference device 80 can provide wavelength references in multiple channels (e.g., generically labeled here as channels A and B). The controller 76 of the OCM module 50 adjusts the temperature of the broadband sources 82 to extend the range over which the wavelength reference device 80 can be used as a source for the multi-band wavelength referencing. In particular, using either of the control techniques described below, the broadband source 82 is thermally tuned with a thermal source 83 to extend the output of the broadband source 82 for multiband operation.

Even when using the device 80 described above, an ultra-wideband OCM may still exceed the capability of a single broadband source used for the wavelength references. In this situation, a multi-source arrangement can be used. For example, FIG. 3C illustrates an ultra-wideband OCM module 50 having a wavelength reference device 80 to provide wavelength references. In this arrangement, the wavelength reference device 80 includes multiple broadband sources 82a-b to provide an ultra-wideband optical signal. Again, these broadband sources 82a-b can be super luminescent light-emitting diodes (SLEDs). A multiplexer 84, combiner, or the like combines the optical signals from the multiple broadband sources 82a-b, and an optical filter 86 filters the combined signals.

The controller 76 of the OCM module 50 adjusts the temperature(s) of the broadband sources 82a-b to extend the range over which the wavelength reference device 80 can be used as a source for the multi-band wavelength referencing. In particular, using either of the control techniques described below, the multiple broadband sources 82a-b are thermally tuned with at least one thermal source 83 to extend the output of the broadband sources 82a-b for multiband operation. For example, one thermal source 83 can be shared by the multiple broadband sources 82a-b. Alternatively, each of the broadband sources 82a-b can have its own thermal source 83. By having the multiple broadband sources 82a-b, the ultra-wideband OCM 50 can operate over a much wider range than could be covered by a single broadband source in the wavelength reference device 80.

As disclosed herein, the multi-band wavelength reference device 80 can be useful in multi-band OCM monitoring. To support C+L band applications with technologies that support single bands, the multi-band wavelength device 80 can reduce the overall cost and footprint of the combined C+L OCM. To support C+L band applications and beyond (e.g., S+C+L) with the ultra-wideband tunable filter technology, the multi-band wavelength reference device 80 can lower costs and reduce the footprint of the multi-band OCM module 50. The multi-band wavelength reference device 80 can also be used in non-OCM applications where such a source is required.

As disclosed herein, the teachings of the present disclosure may be particularly applicable to OCMs, but they can also apply to non-OCM applications, e.g., spectroscopy, so the teachings of the present disclosure are not limited to OCM applications. In fact, the teachings of the present disclosure can provide a solution for any application that requires a wideband optical source.

Turning to further details of the present disclosure, FIG. 4 schematically illustrates a multi-band wavelength reference device 80 according to the present disclosure. The wavelength reference device 80 provides a wavelength reference signal 82 for wavelength-sensitive equipment, which can be an OCM module 50 noted previously or another type of device.

The wavelength reference device 80 includes a broadband optical source 120 and an optical filter 130 having known spectral characteristics. (As noted, the optical source 120 can include one or more broadband sources.) The broadband optical source 120, which is sensitive to temperature and can be a super luminescent light-emitting diode (SLED), produces a broadband signal 122. In turn, the optical filter 130 filters the broadband signal 122 to create one or more unique spectral features that are used as a reference wavelength for the wavelength-sensitive equipment to maintain its wavelength accuracy. (In the discussion that follows, the broadband optical source 120 is described as a SLED. However, the teachings of the present disclosure can apply equally as well to other broadband sources that are sensitive to temperature.)

To extend the output of the SLED 120 for multiband operation, a thermal source 110 is provided to actively adjust the temperature of the SLED 120. The thermal source 110 can be controlled by a controller (e.g., controller 76 of FIGS. 2-3) and can have either heating or cooling capability, or both heating and cooling capability. For example, the thermal source 110 can be a thermally tunable element, a thermoelectric cooler (TEC), a Peltier device, a resistive heater, or another type of controlled heating and/or cooling device.

The optical filter 130 for the device 80 can include a repeating optical filter, which produces a repeating spectral response over a range of wavelengths. The optical filter 130 may not be temperature-dependent, meaning that its spectral response may not depend on the operating temperature of the optical filter 130.

However, in many instances, the optical filter 130 can be temperature-dependent, in which case the optical filter 130 is configured to provide unique spectral features at a known, controlled temperature, or calibrated over a set of temperatures. For example, the optical reference filter 130 can be a Fabry-Perot etalon, which produces the filtered optical signal 82 for output. In other examples, the optical reference filter 130 can include one or more bandpass transmission filters or one or more bandpass notch filters. The filtered optical signal 82 includes one or more reference spectral features having a known wavelength or optical frequency at the known temperature. These spectral features can be in the form of repeating spectral peaks, such as those produced by an etalon's resonant wavelengths. The absolute wavelengths of these spectral peaks are registered in an initial instrument calibration procedure using a separate spectral measurement device, such as an optical signal analyzer (OSA) or wavemeter. This calibration procedure can be performed before or after the assembly of the wavelength reference device 80, depending on the specific design of the WLREF.

Figures 5A, 5B:
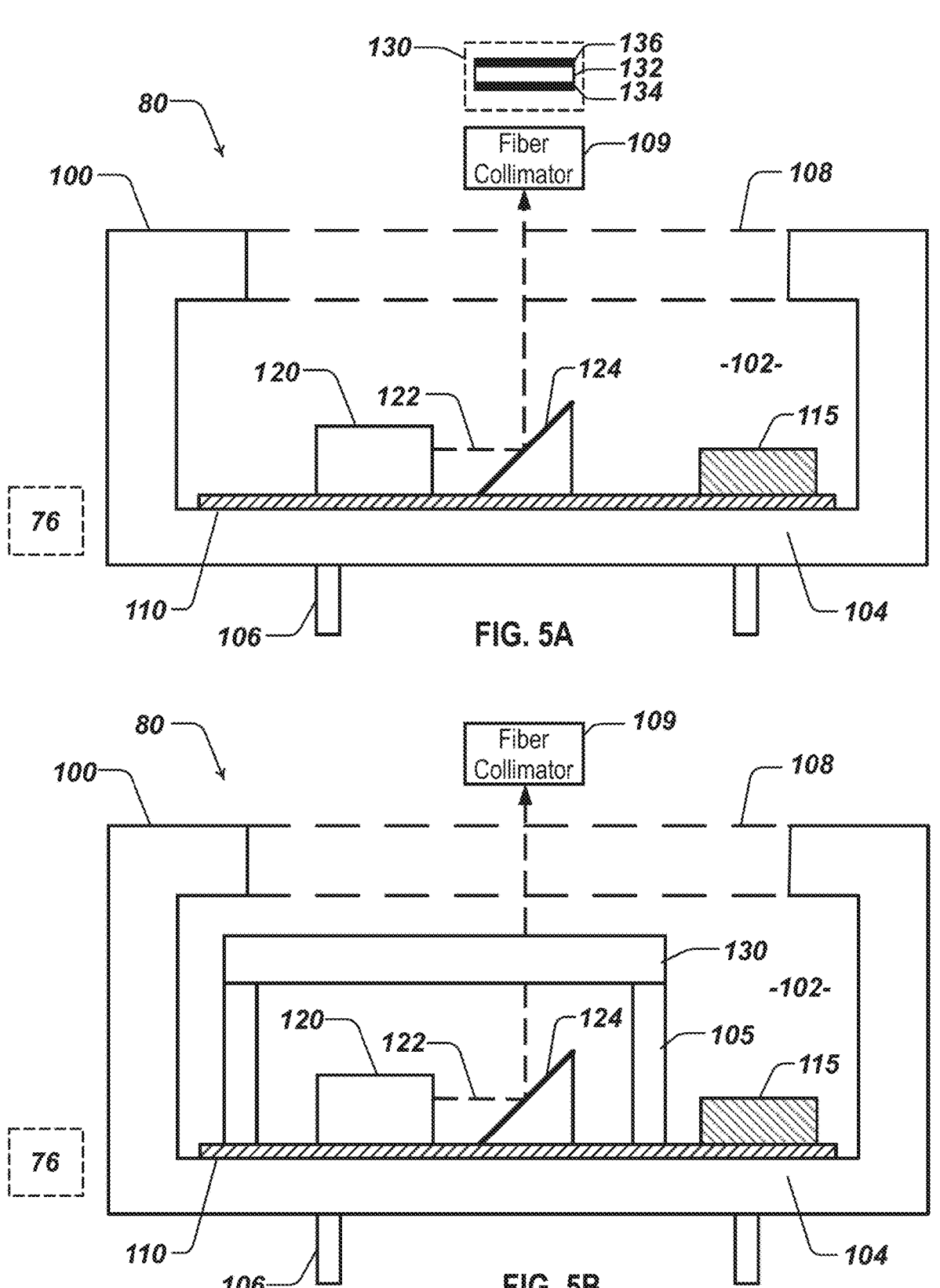
FIG. 5A illustrates one configuration for a wavelength reference device according to the present disclosure.
FIG. 5B illustrates another configuration for a wavelength reference device according to the present disclosure.

FIG. 5A illustrates one configuration for a multi-band wavelength reference device 80 of the present disclosure. The device 80 includes a housing 100 and a SLED 120 for the temperature-sensitive broadband source. The housing 100 defines an internal environment 102 and can be formed of a transistor outline (TO) package, such as a TO-46 package. In addition to providing a sealed protective housing for internal components, the TO package provides for simple mounting of electrical components onto a TO header 104, which forms a base of the housing 100. The TO header 104 includes a plurality of internal electrical pins (not shown) for electrically mounting electrical components thereto and which are connected to external control pins 106. The external pins 106 can be connected to a controller (e.g., 76), such as a digital processor, for powering and providing control signals to components of the device 80.

The SLED 120 is disposed on the TO header 104 within the housing 100. The SLED 120 is configured to emit a broadband optical signal 122 along an optical path through the device 80 to an optical output. The SLED 120 may provide a power spectral density of sufficient magnitude across the wavelength range of interest. For example, power density may be preferable between 1525 nm to 1570 nm for the C-band, between 1570 to 1612 nm for the L-band, and between 1484 nm to 1522 nm (est.) for the S-band.

Because the optical filter (130) for the wavelength reference may be temperature-dependent and preferably operates at a controlled temperature, the housing 100 may not include the optical filter (130) disposed within the housing 100. Instead, the optical reference filter (130) is positioned elsewhere in the optical path to filter the optical signal 122 from the SLED 120.

As noted above, the optical reference filter 130 can include a Fabry-Perot etalon, one or more bandpass transmission filters, or one or more bandpass notch filters. As a Fabry-Perot etalon, the optical filter 130 can be formed of a glass substrate 132 having a pair of parallel sides on which mirrors 134, 136 are deposited. The glass substrate 132 has a finite thickness so the mirrors 134, 136 are separated by a fixed distance. The glass substrate 132 between the mirrors 134, 136 has a refractive index that is known to have a high degree of accuracy. Materials other than glass can be used, or the Fabry-Perot etalon may be formed of two parallel plates 134, 136 separated by an air gap. Either way, the mirrors 134, 136 of the optical filter 130 define a resonant cavity within which the optical signal from the optical source 120 can resonate. Wavelengths that are an integer multiple of the mirror spacing will resonate within the etalon of the filter 130 and will dominate the power of the signal that passes from the filter 130. These resonant wavelengths form the filtered optical signal 82.

As shown here, the SLED 120 is positioned horizontally on the TO header 104 to emit the optical signal 122 horizontally. A turning minor 124 is disposed on the header 104 and angled at approximately 45 degrees to direct the horizontally propagating optical signal 122 vertically. Other arrangements are possible.

The optical signal 122 can be directed through a transparent window 108 in the housing 100. The transparent window 108 is preferably formed of glass material that is highly transparent at the wavelength of the SLED 120.

From the window 108, the optical signal 122 is typically coupled to a fiber collimator 109 for coupling the signal to another component, such as the optical filter (130).

The SLED 120 like other broadband sources can have a wide divergence (up to 10's of degrees) so that collimating/focusing lenses or mirrors can help confine the light for more efficient coupling. Moreover, the window 108 or the housing 100 can include a coupling structure (not shown), such as a fiber connector, to connect a fiber to the device 80. If necessary, the window 108 can include a lensing structure (not shown) to focus, partially focus, collimate, or partially collimate the optical signal 122 to couple it more efficiently into the fiber collimator 109. Likewise, the collimator 109 may be formed integrally with the housing 100 and can be provided as a single package with the device 80 and optionally a length (pigtail) of optical fiber. These and other arrangements are possible.

The device 80 also includes a thermal source 110, which can be mounted external or internal to the housing 100. As shown in FIG. 5A, the SLED 120 is mounted on the thermal source 110, which can actively adjust the temperature of the SLED 120. As noted previously, the thermal source 110 can be controlled by a controller (e.g., controller 76 of FIGS. 2-3) and can have either heating or cooling capability, or both heating and cooling capability. Again, the thermal source 110 can be a thermally tunable element, a thermoelectric cooler (TEC), a Peltier device, a resistive heater, or another type of controlled heating and/or cooling device.

As shown here, the thermal source 110 is mounted within the housing 100 directly onto the TO header 104 for powering by the electrical pins 106. In this configuration, the thermal source 110 forms a base upon which at least the SLED 120 is mounted. In this manner, setting the temperature of the thermal source 110 provides for directly setting the temperature of the SLED 120.

The device 80 also includes a thermistor 115 for sensing temperature. The thermistor 115 can sense the temperature of the thermal source 110 or within the environment 102, and by extension measure the temperature of the SLED 120. Alternatively, the thermistor 115 can measure the temperature of the SLED 120 directly. Yet, the thermal source 110 can include an internal thermistor or temperature sensor, thereby avoiding the need for the separate thermistor 115.

Other components, such as the turning mirror 124 and the thermistor 115 can also be mounted on the thermal source 110. In this manner, setting the temperature of the thermal source 110 provides for directly setting the temperature of all the above components as well.

Together, the controller (76; FIGS. 2-3), the thermal source 110, and the thermistor 115 provide for a complete temperature control loop in which the temperature of at least the SLED 120 can be adjusted during operation. In particular, the external controller (76) can be configured to receive a temperature signal from the thermistor 115. In response, the controller (76) is configured to send a control signal to the thermal source 110 to switch on/off or to increase/reduce the thermal output of the thermal source 110 to adjust the temperature of at least the SLED 120 for the multi-band wavelength reference operations according to the present disclosure. If the thermal source 110 includes temperature sensing capability, this feedback loop may be implemented directly by the thermal source 110 in response to control signals from the controller (76). The temperature control may be based on user-specified or other predefined temperature values for the SLED 120, which are conducive to efficient operation and accurate wavelength referencing as disclosed herein.

If the thermal source 110 is a TEC, the desired temperature range (referred to below) may be arbitrary and may not be related to the operating temperature of any of the dedicated OCM(s) (70-C/70-L or 75) with which the device 80 is associated. By contrast, if the thermal source 110 is a resistive heater, the desired temperature range may preferably be above the maximum operating temperature of the dedicated OCM(s) (70-C/70-L or 75). Both solutions apply to the single-band dedicated OCMs (e.g., 70-C, 70-L of FIG. 2) and the multi-band dedicated OCM (75 of FIG. 3), as well as wavelength reference applications that are not based on optical channel monitoring.

As noted above, the optical filter (130) from the wavelength reference device 80 may be temperature-dependent so that it may be housed separately from the thermal source 110 and the SLED 120. As an alternative, FIG. 5B illustrates another configuration for a wavelength reference device 80 of the present disclosure. The device 80 includes a housing 100, a SLED 120, and an optical filter 130. This device 80 can be operated in a comparable manner as described above with reference to FIG. 5A.

In this configuration, the optical filter 130 may not be temperature-sensitive so it may be housed in the internal environment 104 of the housing 100. Alternatively, the optical filter 130 may be temperature-sensitive, but the temperature adjustments made by the thermal source 110 may fall within a known temperature range suited for the optical filter 130 and its spectral response.

For efficient packaging of the device 80, the optical filter 130 can be positioned above the SLED 120 and the turning mirror 124, and the filter 130 can be held in place by support struts 105. However, this need not be the case, and different orientations and configurations of the SLED 120 and other components are possible.

As disclosed above with reference to FIGS. 4 and 5A-5B, the multi-band wavelength reference device 80 incorporates a thermal source 110, which is a thermally tunable and can be internal or external to the housing 100. The thermal source 110 adjusts the operating temperature of the SLED 120 to change the center wavelength of the SLED 120 to generate optical light for a range of desired wavelengths (e.g., the wavelengths in the multi-bands).

If the bandwidth of the SLED 120 has a spectral power density that is wider than the multiple WDM bands to be monitored, the operating temperature of the SLED 120 can be thermally set within an optimal temperature range that ensures a sufficient power level across the WDM bands. An example of this is provided with reference to FIG. 6A, which graphs a spectral power density 150 of a super luminescent light-emitting diode. The spectral power density 150 of the SLED (120) is shown as a function of the SLED's operating temperature. The spectral power density 150 at different temperatures is shown relative to a multi-band WDM monitoring range 152 in FIG. 6A, which can cover multiple bands, such as C+L bands, S+C+L bands, or the like.

Here, the SLED (120) of the disclosed device (80) may already provide an ultra-wideband spectral power density 150 relative to the multi-band WDM monitoring range 152 for which the wavelength reference device (80) is to be used. However, with the SLED (120) at a low temperature (Low T), the SLED (120) produces a spectral power density 156 that can easily meet a minimum power level 154 towards the lower wavelengths of the range 152, but not towards the higher wavelengths of the range 152. Likewise, with the SLED (120) at a high temperature (High T), the SLED (120) produces a spectral power density 158 that can easily meet the minimum power level 154 towards the higher wavelengths of the range 152, but not towards the lower wavelengths.

In this instance, the thermal source (110) and the temperature feedback thermally set the operating temperature of the SLED (120) to be within a required temperature range (T1 to T2) to ensure sufficient power density is available across the required WDM monitoring bands 152 to be used for wavelength referencing. Here, a first spectral power density 160 is shown for the SLED (120) when set to a first temperature (T1), while a second spectral power density 162 is shown for the SLED (120) when set to a second temperature (T2). Each of these spectral power densities 160, 162 meet the minimum power level 154 at the lower and higher wavelengths of the range 152. By controlling and setting the temperature of the SLED (120) within the required temperature range (T1 to T2), the SLED (120) can provide the required power level 154 for wavelength referencing across the multiple bands (e.g., L-band and C-band) in the range 152.

Viewed in one way, the SLED (120) can be thermally set at an optimum temperature range (T1, T2) so that the center wavelength of the power density 160, 162 (where it is at its peak) lies within (or is centralized in) the multi-band WDM wavelength range 152. This would be true when the power density 160, 162 of the SLED 120 is symmetrical as generally shown here, but this may not be the case. In reality, the power density 160, 162 of the SLED 120 can be less symmetrical. Viewed differently then, the SLED (120) can be thermally set at an optimum temperature range (T1, T2) to shift the power density 160, 162 with respect to the multi-band WDM range 152 so the shifted power density 160, 162 meets the minimum power level 154 towards both the lower frequencies 153a and the upper frequencies 153b of the multi-band WDM range 152.

Ultimately, the associated OCM(s) can then use the spectral content from the output of the disclosed wavelength reference device (80) for the required monitoring in the multi-band WDM wavelength range 152. The SLED's operating temperature can be maintained irrespective of the operating temperature of the OCM (e.g., 70-C/70-L or 75) for which the SLED (120) is associated.

In contrast to the above, if the bandwidth of the SLED (120) has a spectral power density that is narrower than the multi-band WDM wavelength range 152 to be monitored (but the difference is less than the SLED's temperature-dependent center wavelength shift), the operating temperature of the SLED (120) can instead be thermally scanned across an optimal temperature range that ensures sufficient power across the entire multi-band WDM wavelength range 152 at different times. An example of this is provided with reference to FIG. 6B, which graphs the spectral power density of a super luminescent light-emitting diode (SLED 120) thermally scanned across an operating range. Again, the spectral power density 150 of the SLED (120) is shown as a function of the SLED's operating temperature. Also, the spectral power density 150 at different temperatures is shown relative to a multi-band WDM monitoring range 152 in FIG. 6B, which can cover multiple bands, such as C+L bands, S+C+L bands, or the like.

Here, the SLED (120) of the disclosed device (80) provides a wideband spectral power density 150 that cannot cover the required multi-band WDM wavelength range 152. With the SLED (120) at a low temperature (Low T), for example, the SLED (120) produces a spectral power density 156 that meets the minimum power 154 toward the lower frequencies of the range 152. With the SLED (120) at a high temperature (High T), the SLED (120) produces a spectral power density 158 that meets the minimum power 154 toward the higher frequencies of the range 152. Yet, neither provides sufficient coverage over the range 152.

In this instance, the thermal source (110) and the temperature feedback thermally scan the operating temperature of the SLED (120) over time within a defined temperature range (T1 to T2) to ensure sufficient power density is available across the required WDM monitoring bands 152 to be used for wavelength referencing. Scanning the operating temperature of the SLED (120) can take different forms. The operating temperature can be thermally scanned at multiple discrete times and in discrete increasing/intervals across a required temperature range (T1 to T2). Alternatively, the thermal scanning can decrease and increase more continuously, in a ramp up/down function, sawtooth function, or a more random fashion.

As noted, the SLED (120) can be thermally scanned to within an optimum temperature range (T1, T2) to shift the power density 150 with respect to the multi-band WDM range 152 so the shifted power density 160, 162 meets a minimum power level 154 at least temporally towards the lower frequencies 153a and the higher frequencies 153b of the multi-band WDM range 152.

Ultimately, the associated OCM(s) can then use the spectral content from the output of the disclosed wavelength reference device (80) for the required monitoring in the multi-band WDM wavelength range 152. The SLED's operating temperature can be scanned irrespective of the OCM's operating temperature for which the SLED (120) is associated.

Because the operating temperature of the SLED 120 is scanned across a temperature range at different times, multiple measurements can be combined to produce an overall wavelength reference spectrum in this instance. To do this, the measurements by the OCM(s) of the wavelength reference from the disclosed device (80) can be coordinated with the scanning of the SLED's operating temperature. The multiple wavelength reference measurements can then be combined to synthesize a composite measurement of the entire WDM monitoring band 152.

For reference, details of a conventional super-luminescent light-emitting diode (SLED) are discussed. In particular, graphs in FIGS. 7A-7B provide some guidance on configuring the temperature control of a SLED in a wavelength reference device of the present disclosure for use in multi-band operations.

Figures 7A, 7B:
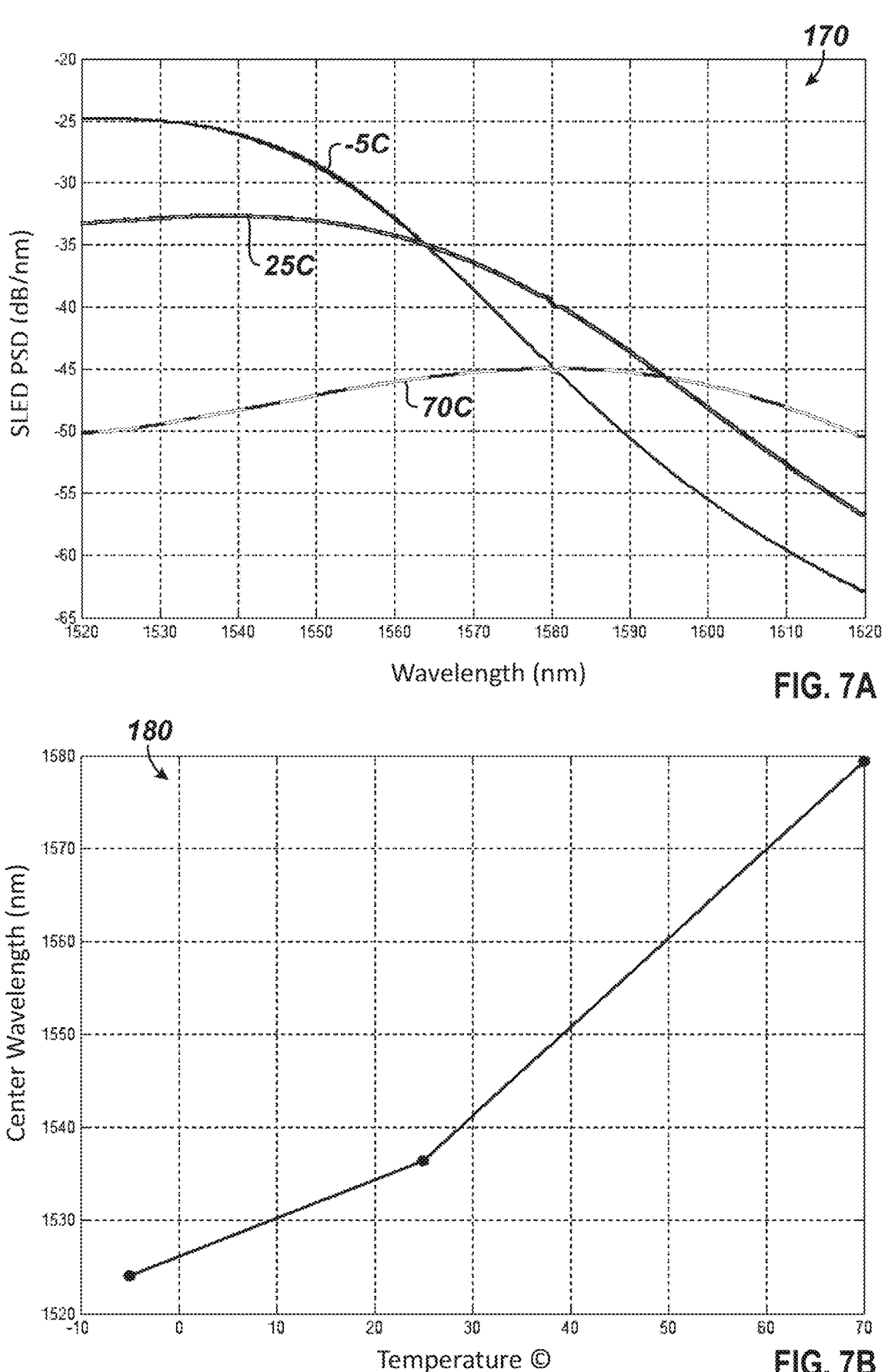
FIG. 7A graphs power spectral density versus wavelength at three temperatures for a conventional super luminescent light-emitting diode.
FIG. 7B graphs center wavelength versus temperature for the conventional super luminescent light-emitting diode.

In FIG. 7A, the power spectral density for a conventional SLED is graphed versus wavelength at three example temperatures (−5 C, 25 C, 70 C). In FIG. 7B, the center wavelength for the conventional SLED is graphed versus temperature. For consideration, the following WDM band ranges can be assumed: S-band range of 202.0 to 197.0 THz, 1484 to 1522 nm (est.); C-band range of 196.5 to 191.5 THz, 1525 to 1565 nm; and L-band range of 191.0 to 186.0 THz, 1570 to 1612 nm.

Figures 6A, 6B:
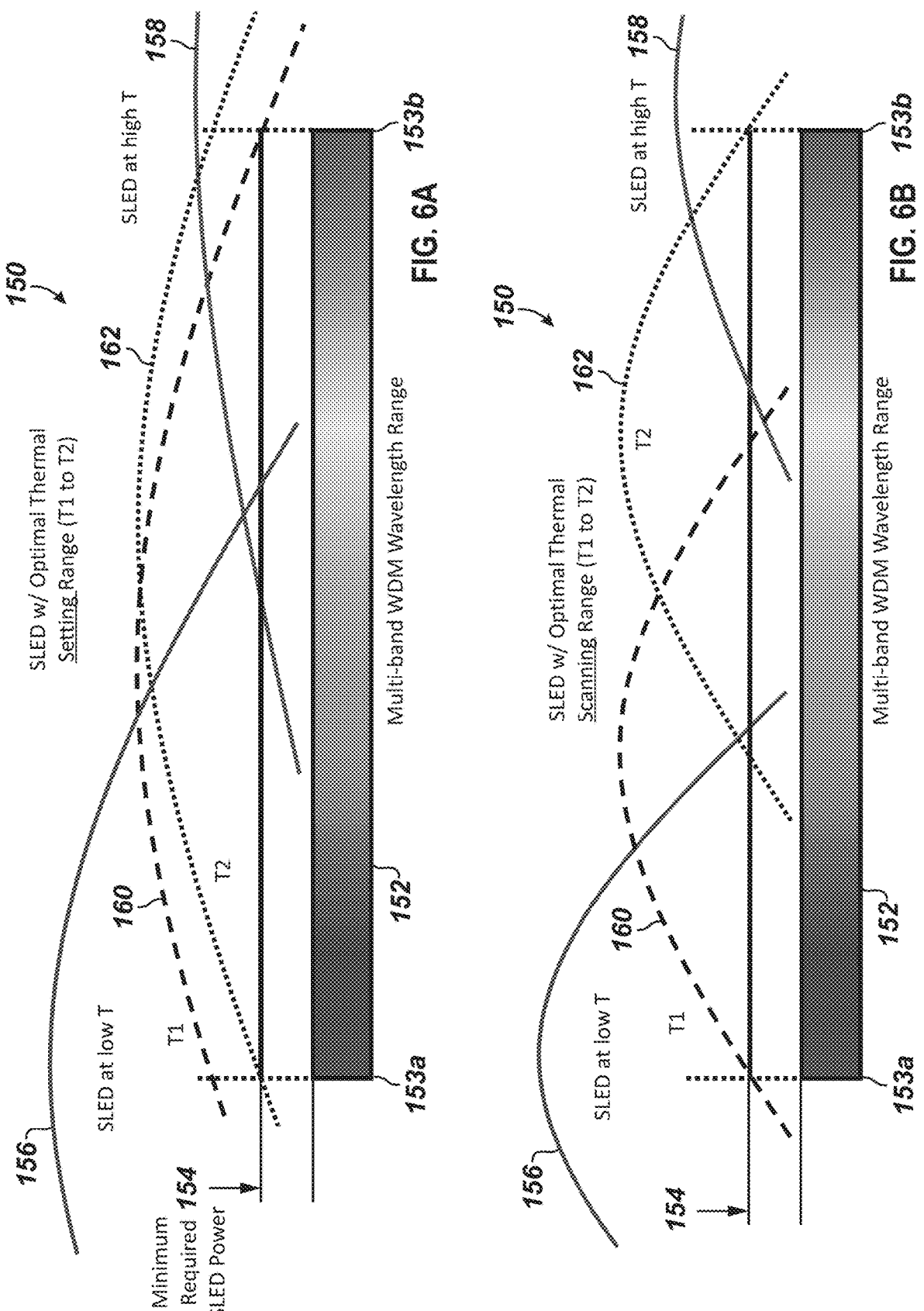
FIG. 6A graphs a spectral power density of an ultra-wideband super luminescent light-emitting diode thermally set to an operating temperature range.
FIG. 6B graphs a spectral power density of an ultra-wideband super luminescent light-emitting diode thermally scanned across an operating temperature range.

Assuming that the required power level (154; FIGS. 6A-6B) to be output from the SLED (120) should be greater than −50 dBm/nm, the conventional SLED implemented in a prior art arrangement could only be used in practice for C-band applications. However, this SLED implemented in a first arrangement of the present disclosure thermally setting the operating temperature of the SLED between about 35 C to 70 C indicates that the SLED can be used for C+L wavelength reference operation. Furthermore, this SLED implemented in a second arrangement of the present disclosure thermally scanning the operating temperature of the SLED between about −5C to 70 C indicates that this SLED can be used for S+C+L wavelength operation.

The foregoing description of preferred and other embodiments is not intended to limit or restrict the scope or applicability of the inventive concepts conceived of by the Applicants. It will be appreciated with the benefit of the present disclosure that features described above in accordance with any embodiment or aspect of the disclosed subject matter can be utilized, either alone or in combination, with any other described feature, in any other embodiment or aspect of the disclosed subject matter.

In exchange for disclosing the inventive concepts contained herein, the Applicants desire all patent rights afforded by the appended claims. Therefore, it is intended that the appended claims include all modifications and alterations to the full extent that they come within the scope of the following claims or the equivalents thereof.

What is claimed is:

1. An apparatus to process a signal input, the apparatus comprising:

an apparatus input configured to receive the signal input;

a signal detection and processing module configured to detect and process the signal input;

a wavelength reference device, the wavelength reference device, comprising:

at least one broadband optical source being configured to emit an optical power spectrum along an optical path, the at least one broadband optical source being temperature sensitive, the optical power spectrum having a broadband wavelength range in a plurality of wavelength division multiplexing (WDM) bands;

at least one thermal source disposed in thermal communication with the at least one broadband optical source and being configured to adjust an operating temperature of the at least one broadband optical source within a temperature range, the temperature range being configured to shift the optical power spectrum of the at least one broadband optical source with respect to the plurality of WDM bands such that the optical power spectrum meets a minimum power level within each of the plurality of WDM bands; and an optical filter positioned in the optical path, the optical filter being configured to filter the optical power spectrum into a wavelength reference signal, the wavelength reference signal including at least one reference spectral feature for at least one known optical frequency, the wavelength reference device disposed in optical communication with the apparatus input, and being configured to produce the wavelength reference signal; and at least one controller in signal communication with at least the signal detection and processing module and the wavelength reference device, the at least one controller configured to control the wavelength reference device and configured to calibrate the signal detection and processing module based on the produced wavelength reference signal, wherein the signal detection and processing module comprises:

a first submodule having a first portion of the apparatus input and being configured to detect and process the signal input in a first band of the plurality of WDM bands; and at least one second submodule having at least a second portion of the apparatus input and being configured to detect and process the signal input in at least one second band of the plurality of WDM bands, wherein the apparatus input comprises:

a first splitter configured to split the signal input into the first and at least one second bands for the respective first and at least one second submodules; and a second splitter configured to split the wavelength reference into the first and at least one second bands for the respective first and at least one second submodules.

2. The apparatus of claim 1:

wherein the at least one broadband optical source comprises a super-luminescent light-emitting diode (SLED) and—the plurality of WDM bands includes at least two of an S-Band range, a C-band range, and an L-band range.

3. The apparatus of claim 2, further comprising (i) a housing having the at least one broadband optical source, the at least one thermal source, and the optical filter disposed therein; or (ii) a housing having the at least one broadband optical source and the at least one thermal source disposed therein.

4. The apparatus of claim 3, is disposed on an interior surface of the housing, and/or forms a base on which the at least one broadband optical source is mounted.

5. The apparatus of claim 2, wherein the at least one thermal source comprises a thermal device having heating and/or cooling functionality, a resistive heater, or a thermoelectric cooler element.

6. The apparatus of claim 2, further comprising a temperature sensor disposed in thermal communication with the at least one thermal source and/or the at least one broadband optical source.

7. The apparatus of claim 6, wherein the controller is in electrical communication with the at least one thermal source and the temperature sensor, the controller being configured to monitor a temperature reading of the temperature sensor and being configured to adjust electrical power to the at least one thermal source in response to the monitored temperature reading.

8. The apparatus of claim 1, wherein the optical filter is configured to filter the optical power spectrum into the wavelength reference signal that includes the at least one reference spectral feature for the at least one known optical frequency at at least one known temperature.

9. The apparatus of claim 1, wherein the optical filter comprises a Fabry-Perot etalon, one or more bandpass transmission filters, or one or more bandpass notch filters.

10. The apparatus of claim 1, wherein the at least one broadband optical source comprises a plurality of broadband optical sources, each configured to emit an optical signal in the optical power spectrum; and wherein the wavelength reference device comprises a multiplexer disposed between the broadband optical sources and the optical filter, the multiplexer configured to combine the optical signals from the broadband optical sources for the optical filter.

11. The apparatus of claim 10, wherein the at least one thermal source comprises one thermal source disposed in thermal communication with each of the broadband optical sources, or wherein the at least one thermal source comprises a plurality of thermal sources, each disposed in thermal communication with one of the broadband optical sources.

12. The apparatus of claim 1, further comprising an optical monitor disposed in optical communication with the wavelength reference signal and being configured to use the wavelength reference signal as the wavelength reference for monitoring.

13. The apparatus of claim 12, wherein the optical monitor operates at a separate operating temperature, the at least one thermal source being configured to adjust the operating temperature of the at least one broadband optical source within the temperature range irrespective of the separate operating temperature of the optical monitor.

14. The apparatus of claim 12, wherein the at least one thermal source is configured to thermally set the operating temperature of the at least one broadband optical source within the temperature range to ensure sufficient power across the plurality of WDM bands of the wavelength reference for monitoring.

15. The apparatus of claim 12, wherein the at least one thermal source is configured to thermally scan the operating temperature of the at least one broadband optical source at multiple times to ensure sufficient power across the plurality of WDM bands of the wavelength reference for monitoring.

16. The apparatus of claim 15, wherein the optical monitor is configured to coordinate the monitoring to the scanning at the multiple times, the optical monitor being configured to combine responses to the wavelength reference at the multiple times to the operating temperatures of the at least one broadband optical source and being configured to synthesize a spectrum for the wavelength reference based on the combination.

17. The apparatus of claim 1, wherein the apparatus is an optical channel monitor configured to monitor the signal input in the plurality of WDM bands; and wherein the apparatus input comprises an optical switch module being operable to switch the signal input to be passed to the signal detection and processing module.

18. The apparatus of claim 1, wherein the signal detection and processing module operates at a separate operating temperature; and wherein the at least one thermal source of the wavelength reference device is configured to adjust an operating temperature of the at least one broadband optical source within a temperature range irrespective of the separate operating temperature of the signal detection and processing module.

19. The apparatus of claim 1, wherein the at least one thermal source is configured to thermally set an operating temperature of the at least one broadband optical source within a temperature range to ensure sufficient power across the plurality of WDM bands of the wavelength reference for monitoring.

20. The apparatus of claim 1, wherein the at least one thermal source is configured to thermally scan an operating temperature of the at least one broadband optical source at multiple times to ensure sufficient power across the plurality of WDM bands of the wavelength reference for monitoring.

21. The apparatus of claim 20, wherein the at least one controller is configured to coordinate monitoring of the wavelength reference with the thermal scanning of the operating temperature at the multiple times, the at least one controller being configured to combine responses to the wavelength reference at the multiple times to the operating temperatures of the broadband optical source and being configured to synthesize a spectrum for the wavelength reference based on the combination.

* * * * *